May 30, 1950 P. R. SCHROEPPEL 2,509,371
MACHINE FOR HARVESTING GREEN PEAS
Filed June 10, 1944 5 Sheets-Sheet 1
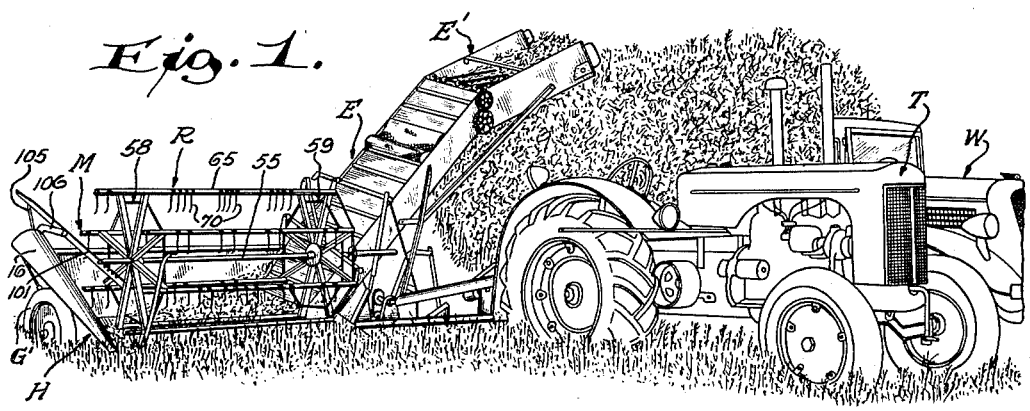
Fig. 1.
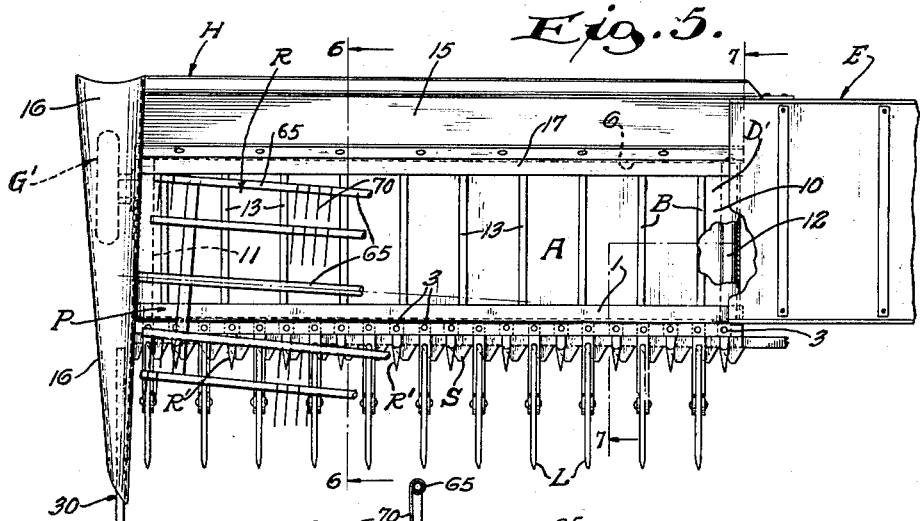
Fig. 5.
Fig. 6.
INVENTOR.
PAUL R. SCHROEPPEL
BY William F. Buckley
ATTORNEY.

May 30, 1950 P. R. SCHROEPPEL 2,509,371
MACHINE FOR HARVESTING GREEN PEAS
Filed June 10, 1944 5 Sheets-Sheet 2
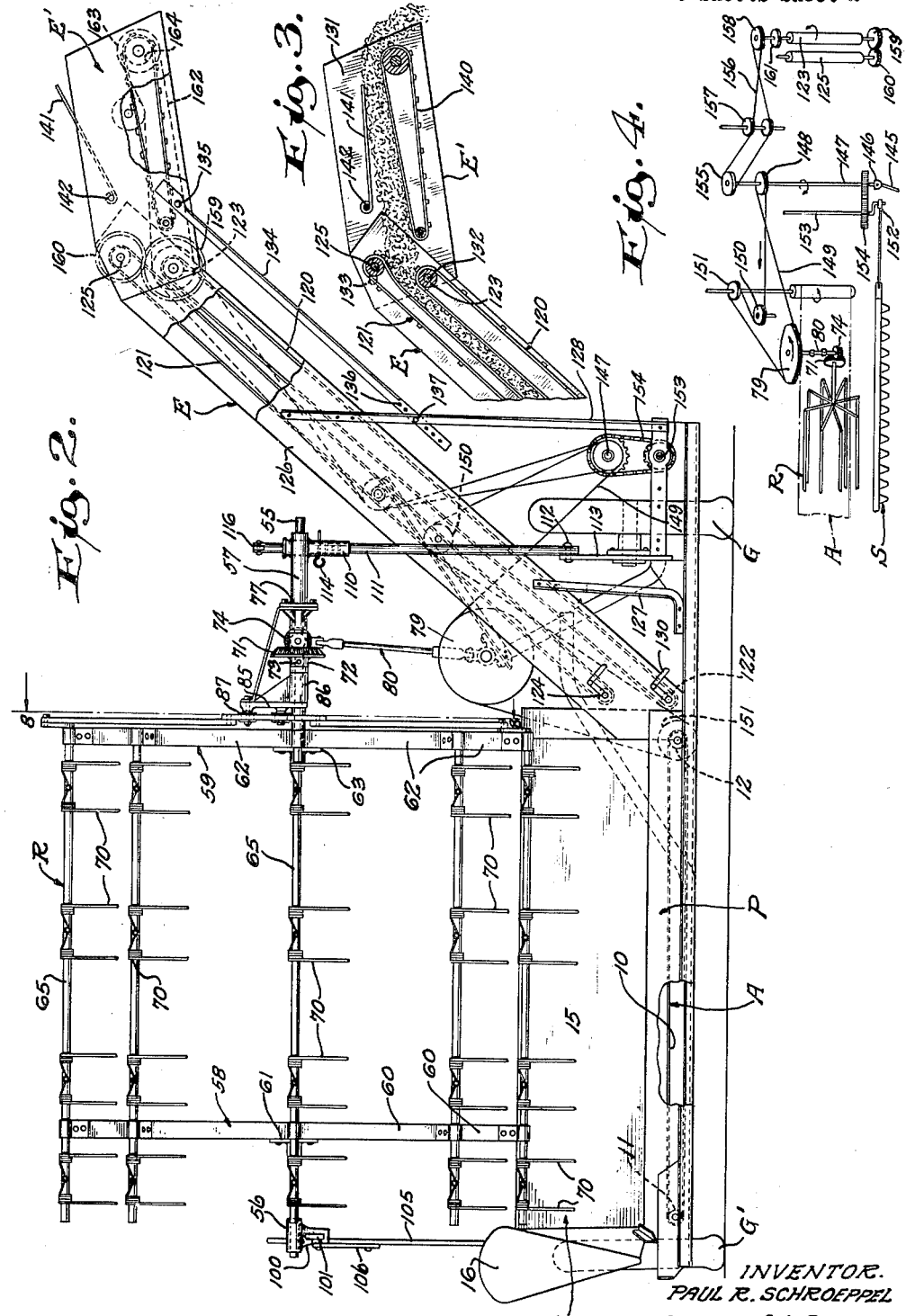
INVENTOR.
PAUL R. SCHROEPPEL
By William F. Buckley
ATTORNEY.

May 30, 1950 P. R. SCHROEPPEL 2,509,371
MACHINE FOR HARVESTING GREEN PEAS
Filed June 10, 1944 5 Sheets-Sheet 3
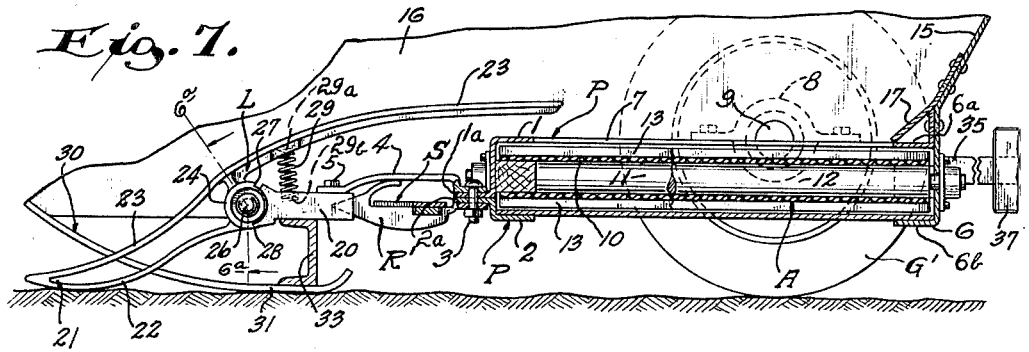
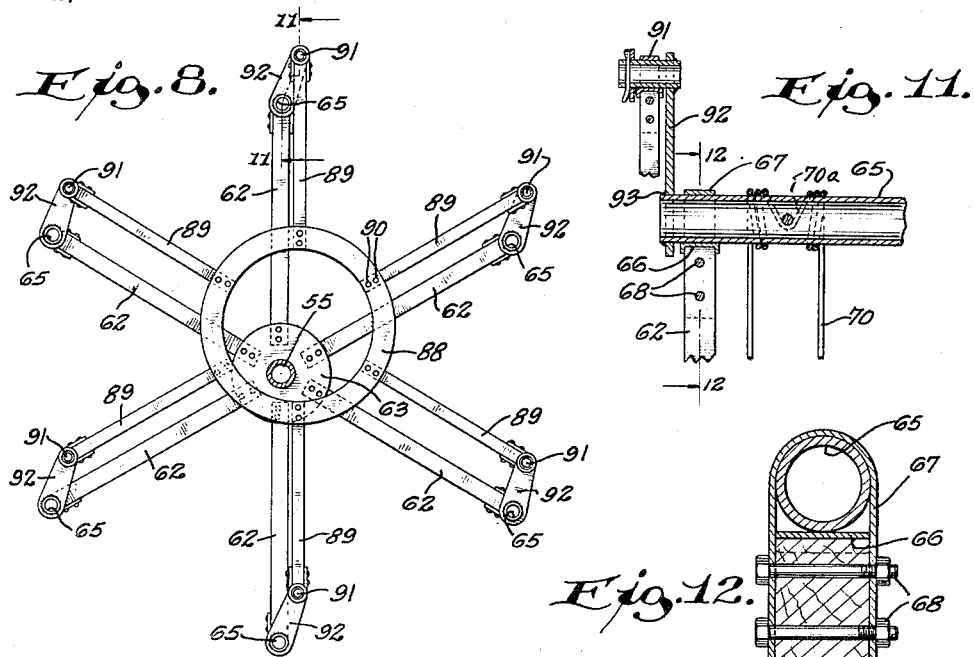
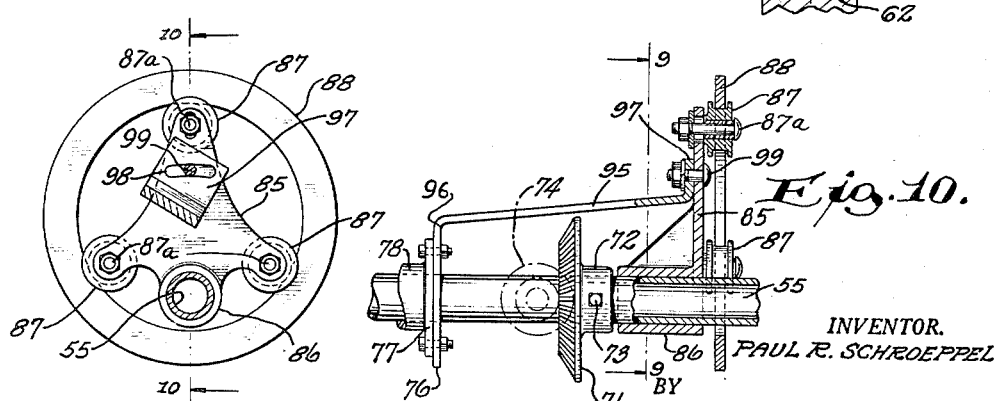
INVENTOR.
PAUL R. SCHROEPPEL
BY
William F. Buckley
ATTORNEY.

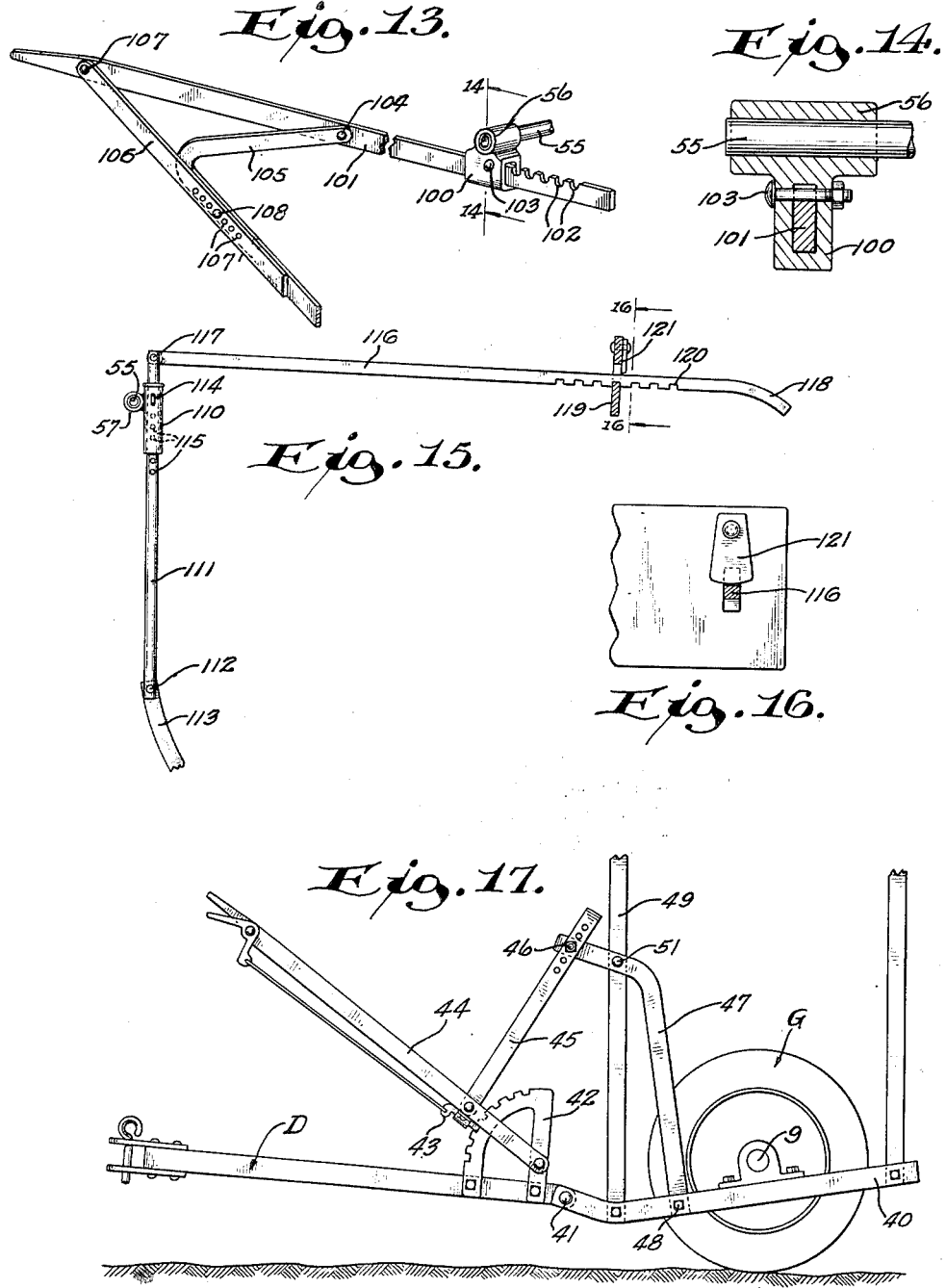

May 30, 1950 P. R. SCHROEPPEL 2,509,371
MACHINE FOR HARVESTING GREEN PEAS
Filed June 10, 1944 5 Sheets-Sheet 5
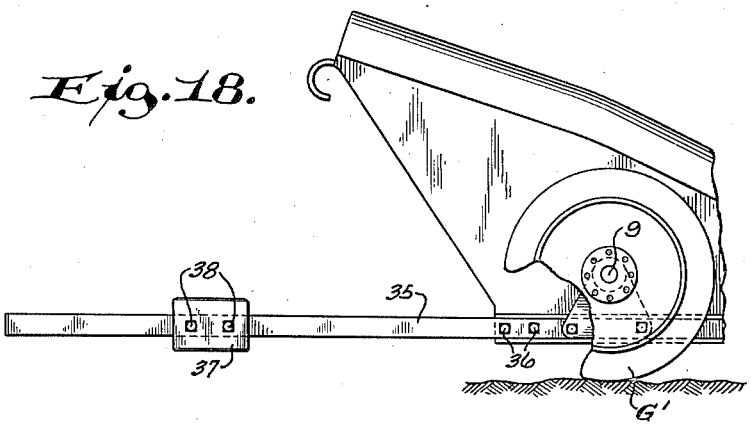
Fig. 18.
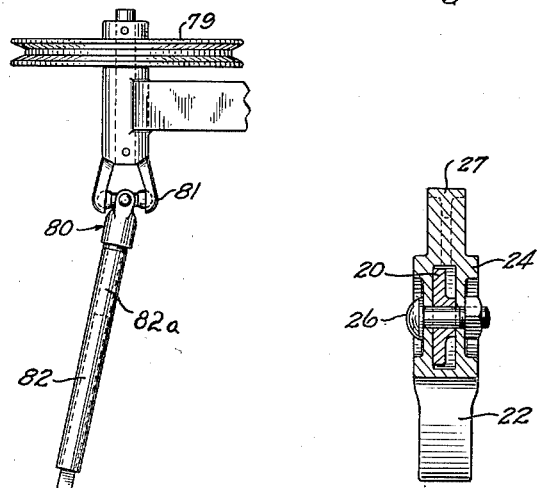
Fig. 19.
Fig. 6ᵃ
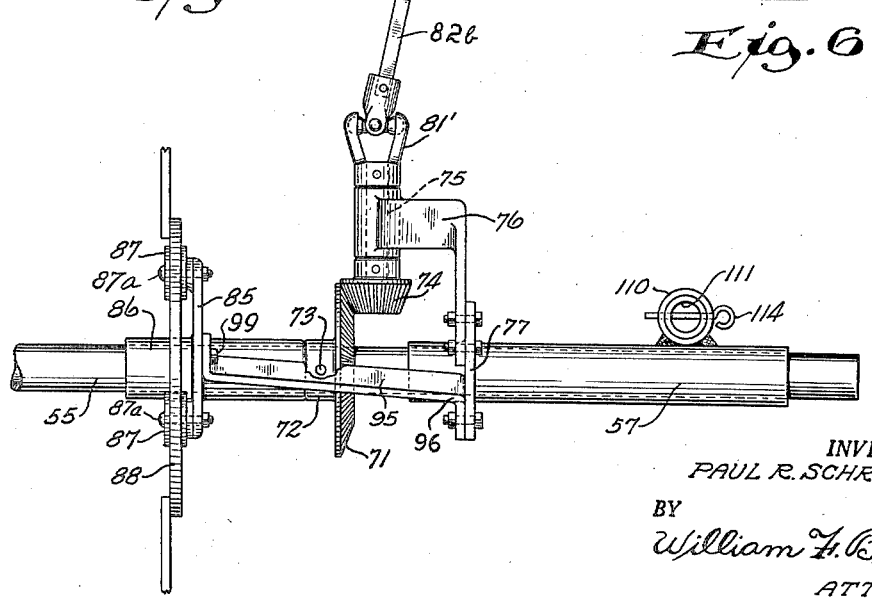
INVENTOR.
PAUL R. SCHROEPPEL
BY
William F. Buckley
ATTORNEY.

Patented May 30, 1950

2,509,371

UNITED STATES PATENT OFFICE 2,509,371

MACHINE FOR HARVESTING GREEN PEAS

Paul R. Schroeppel, Rockford, Ill., assignor to J. I. Case Company, Racine, Wis., a corporation of Wisconsin Application June 10, 1944, Serial No. 539,676

7 Claims. (Cl. 56—23)

This invention relates to an improvement in harvesting machines of the type especially designed and adapted for harvesting green peas.

The broad object of the invention is to provide a machine which cuts and loads the peas in one operation.

Another object of the invention is to provide a machine capable of cutting and loading the peas in one operation and which, while highly efficient, is of light weight.

Among the factors which contribute to the light weight is the manner in which the conveyors of the machine are constituted, supported and functionally inter-related.

Another object of the invention is to provide a machine of this character equipped with a specially constructed header which is combined in a special way with a special type of feathering reel, the several parts of these instrumentalities being so constructed, organized and functionally inter-related that they operate to get under and lift up tangled pea vines, bring them into the field of action of the sickle or cutting mechanism at the forward edge of the platform and then deposit the severed vines on the transverse or receiving conveyor of the platform. For this purpose, the platform is provided with regular guards and also with pick-up guards. The pick-up guards have pointed forward ends projecting forwardly of the regular guards and adapted to get under and lift tangled pea vines and also have guide rails curving upwardly and extending rearwardly from said pointed ends to points overlying the receiving conveyor of the platform. The feathering or eccentric reel has pick-up fingers or tines movable between the pick-up guards to take the material that has been lifted by the pick-up guards and cut by the sickle and carry it over and off the pick-up guards and place it on the receiving conveyor of the platform.

By utilizing a pick-up or feathering reel in cooperation with the regular guards and pick-up guards, the delivery of the cut vines onto the platform under all of the conditions met in the field is insured. Entanglement is avoided. This is important when it is considered that peas, when ready, have to be cut in all weather conditions.

The platform conveyor which initially receives the cut crop is supplemented in its action by a sloping backward which allows the cuttings to be kicked completely free of the reel and which provides a very effective guide for delivering the cuttings from the conveyor on which they are deposited to the elevator conveyors which carry them to the wagon utilized to transport them to the point of storage.

Another feature of importance is that of disposing the pickup or feathering reel in eccentric or inclined relation to the receiving platform or conveyor and its backboard. At the outer divider the reel axis, when conditions require, may be closer to the backboard than it is at the point where the platform delivers the cut crop to the elevators, with the result that the accumulation of the cut crop may be better accommodated.

The feathering reel is so constructed, organized and mounted that it may be adjusted forward, back, up or down. The feathering mechanism is constructed in a special and novel way so that it may be located at the inner end of the reel, without interfering with the transmission of the drive to the reel or the transmission of the feathering motion to the pick-up fingers or tines thereof and while permitting the adjustment of the outer end of the reel to the rear without disturbing the inner end thereof. The construction thus far generally described also lends itself to one in which the outer spider of the reel, that is, the spider adjacent the outer divider, may be offset inwardly to avoid winding.

Another object of the present invention is to provide an effective means to prevent entanglement of the pea vines lying at the outer border of the swath cut by the sickle with the adjacent instrumentalities of the machine. To this end, a runner or ground shoe is provided and underlies and is fixed to the outer divider and to the platform at the outer side of the machine. The runner or ground shoe takes over the function of the outer divider and serves to press or crush against the ground the peas lying at the outer border of the swath cut by the sickle, rather than to part them after the manner of the outer divider.

Another object of the invention is to provide means for controllably varying the pressure exerted by the runner or ground shoe on the underlying pea vines. This is preferably accomplished by fixing an arm to the outer side of the platform, the arm fulcruming or pivoting on the axis of rotation of the outer ground wheel, with the arm projecting rearwardly beyond the platform, and mounting an adjustable weight on the rearwardly projecting portion of said arm. There are field conditions and diseases that develop in the vines that make pressure variations necessary. At the inner side of the machine the platform is pivotally connected to the draw bar employed to hitch the machine to the tractor which pulls it across the field. Manually adjustable means is provided to control the relative angular positions of the platform and draw bar about said pivot.

Another feature of advantage is the way in which the receiving platform is combined with the elevator. The elevator comprises two endless canvas conveyors, one disposed above the other, and inclining upwardly and laterally from the frame of the machine. The platform extends below these elevators and serves as a shield to prevent the platform and elevator rollers from wrapping with the pea vines on the ground before they are picked up and transported onto and under the control of the conveyors of the platform and elevator.

Another feature of the invention is the manner in which the two endless canvas belt conveyors constituting the elevators are inter-related so that they converge toward the point of the discharge of the elevator, and at the point of discharge the upper canvas overlaps or extends beyond the lower to provide for the requisite flexibility.

The cut vines delivered to the elevator conveyors from the receiving platform or conveyor are consequently gradually compressed as they are conveyed and thus are conditioned for better delivery to the wagon or trailer which is to transport them to the viner.

At the upper end of the elevator an adjustable discharge conveyor is provided and this overhangs the wagon or trailer. Both the elevators and the discharge conveyor are supplemented by suitable troughs which may be constituted of sheet metal inclusive only of side walls.

Another object of the invention is to provide a simple, practical working drive mechanism for the sickle, the reel and the conveying mechanism, and one which is flexible, versatile though rugged in its action. In the main, this is accomplished by resort to a novel form of belt and pulley mechanism and one which closely and effectively coordinates the actions of the instrumentalities mentioned.

These objects of the invention and other ancillary advantages are attained by the mechanism, construction, and arrangement illustrated in the accompanying drawings forming part hereof, in which—

Fig. 1 is a perspective view of a machine for cutting and loading peas and illustrating generally the way in which it is associated with the tractor which pulls it and the wagon or truck into which the cut pea vines are loaded;

Fig. 2 is a view in front elevation of a machine for cutting and loading green peas embodying the present invention, with parts omitted and parts broken away for the sake of illustration;

Fig. 3 is a fragmentary view of the upper end of the main elevator and of its adjustable extension, one of the side plates of the trough of the elevator and of the trough of the extension being omitted and parts being shown in longitudinal vertical cross section for the sake of illustration;

Fig. 4 is a diagrammatic view illustrating the drive mechanism for the sickle, reel and the rollers of the main elevator conveyor;

Fig. 5 is a fragmentary view in top plan showing the header, the reel being shown in an inclined position and parts being broken away and shown in section for the sake of illustration;

Fig. 6 is a view in longitudinal vertical cross section taken on line 6—6 of Fig. 5;

Fig. 6a is a detail sectional view taken on line 6a—6a of Fig. 7;

Fig. 7 is a fragmentary view similar to Fig. 6 but taken on an enlarged scale on the line 7—7 of Fig. 5 to illustrate more clearly the platform construction, the construction of the regular and pick-up guards, and the way in which they are mounted on the platform;

Fig. 8 is a view in vertical cross section taken on line 8—8 of Fig. 2 with the carrier plate and the eccentric rollers of the feathering mechanism of the reel omitted for the sake of clearness in illustration;

Fig. 9 is a view in vertical cross section taken on line 9—9 of Fig. 10;

Fig. 10 is a fragmentary detail view taken on line 10—10 of Fig. 9 with parts shown in elevation for the sake of simplicity in illustration;

Fig. 11 is a fragmentary view taken on line 11—11 of Fig. 8 with parts shown in elevation for the sake of simplicity in illustration;

Fig. 12 is a similar view taken on line 12—12 of Fig. 11;

Fig. 13 is a fragmentary perspective view showing one means for adjusting the outer end of the reel fore and aft and up and down;

Fig. 14 is a fragmentary detail view taken on line 14—14 of Fig. 13;

Fig. 15 is a fragmentary view partly in elevation and partly in vertical cross section showing one means which may be employed for mounting the inner end of the reel for adjustment fore and aft and up and down;

Fig. 16 is a fragmentary detail view taken on line 16—16 of Fig. 15;

Fig. 17 is a fragmentary view in side elevation showing one form of manually adjustable means for controlling the angular relation between the inner end of the platform and the draw bar;

Fig. 18 is a fragmentary detail view in side elevation showing one way in which the outer end of the platform of the header may be counterbalanced to vary the force with which the ground or runner shoe is pressed downwardly; and Fig. 19 is a fragmentary view in bottom plan showing one way in which the driving pinion of the beveled gears which transmit the drive to the reel and its feathering mechanism may be actuated.

Referring to the drawings and more particularly to Fig. 1, it will be seen that the present invention proposes the use of a tractor T for pulling across the field a machine M designed and adapted for cutting and loading peas, and embodying the present invention. The tractor T is hitched to the machine M by means of the conventional draw bar D (see Fig. 17). The peas cut or harvested by the machine M are loaded or delivered into a wagon or truck W which transports them to the viner.

The machine M comprises generally a header H, a reel R, a main elevator E and an adjustable elevator extension E'.

The header H includes generally a platform P supported for movement over the ground and for tilting movement with respect thereto by means of inner and outer ground wheels G and G'. Cutting mechanism in the form of a sickle S is provided at the forward edge of the platform P. The platform is equipped with regular guards R' and elongated pick-up or lifter guard I of special construction. The platform P is provided with a receiving conveyor or draper designated generally at A onto which the vines lifted by the pick-up guards L and cut by the sickle S are pushed by the reel R.

The platform P includes a rectangular metal frame F fabricated in any suitable way. Preferably, as shown in Figs. 2, 5, 6 and 7 the frame F has its front frame member constituted of two double flanged sheet metal stampings designated at 1 and 2 (see Fig. 7) which have their forwardly projecting flanges 1ª and 2ª respectively securely fastened together by bolts and nuts 3. These same bolts and nuts 3 also serve to fasten the attaching portions of the regular guards R' to the platform P and further mount and fasten to the platform the attaching bracket 4 upon which the pick-up or lifter guards L are in turn mounted and secured by bolts and nuts 5. The rear frame member 6 may be a sheet metal channel having upper and lower flanges 6ª and 6ᵇ. At their ends the front and rear frame members are suitably cross connected, the cross connections, designated at 7, supporting bearing brackets 8 in which the supporting axles 9 of the ground wheels G and G' are journaled.

The receiving conveyor A of the platform P comprises an endless belt 10 which may be rubberized canvas, and which is reeved or trained around an idler roller 11 and a drive roller 12 supported for rotation in suitable bearings provided therefor in the frame F of the platform P. At regularly longitudinal intervals, the belt 10 has transversely extending cleats or strips 13 fixed thereto to enhance the traction between the upper run of the belt and the cut pea vines deposited thereon. The side edges of the endless belt 10 and the ends of the cleats or cross strips 13 travel within the confines of the inturned upper and lower flanges 1 and 2 of the front and 6ª and 6ᵇ of the rear members of the frame F. At its delivery end D', the receiving conveyor A lies substantially on a level with and in cooperative or delivering relation to the lower entrance end of the main elevator E.

The platform P is provided with a sloping backboard 15 (see Figs. 2, 5, 6 and 7) attached to and inclining upwardly and rearwardly from the rear member 6 of the frame F of the platform.

The sloping backboard 15 extends across the entire rear edge of the platform P from the outer divider 16 to one of the side members of the trough of the main elevator conveyor E, and is attached at its ends to the outer divider and to the said wall of the elevator.

A suitably shaped bridging strip 17 is provided at the juncture of the lower part of the sloping back wall and the upper flange of the rear frame member 6 as shown in Figs. 5, 6 and 7. With such a construction the sloping backboard so combined with the platform provides a continuous guide and allows the reel R, when operating, to kick the cut pea vines completely clear of the guards.

The regular guards are of conventional construction and need not be described in detail. The pick-up or lifter guards L are of special construction and are shown to advantage in Figs. 5, 6, 6a and 7. As is shown, each pick-up or lifter guard comprises an attaching portion 20 bolted by the bolts and nuts 5 to its mounting bracket 4. The guards are elongated and project well forwardly of the regular guards R. Each pick-up or lifter guard comprises, in addition to its attaching portion 20, a combined ground shoe and guide rail designated as a whole at 21.

The ground shoe is constituted of a suitably curved strip 22 of metal which is upturned at its outer or left end as seen in Fig. 6 and integral with the outer end of the strip-like guide rail 23. The juncture of the ground shoe 22 and guide rail 23 of each pick-up or lifter guard is pointed. Each guide rail 23 curves upwardly and extends rearwardly to a point overlying the conveyor A of the platform P.

At the point where the combined ground shoe and guide rail is mounted on the attaching portion 20 these parts 22 and 23 are cross-connected by a web 24. The web 24 is centrally enlarged and pivoted on a pin 26 carried by attaching portion 20. The pivotal motion of each combined ground shoe and guide rail 21 is limited by co-operating stops 27 and 28 provided on the ground shoe and attaching portion, respectively of each pivot guard.

A spring 29 having its ends received in suitable recesses or sockets 29ª and 29ᵇ in each attaching portion 20 and the under side of each guide rail 23 of each pick-up or lifter guards tends to urge the forward pointed ends of each pick-up or lifter guard downwardly and to bring the stops 28 into engagement. With such a construction the pick-up or lifter guards L are adapted to get under and lift tangled pea vines and enable the fingers or tines of the reel R to take the material that has been lifted by the pick-up guards L and cut by the sickle S, and carry it over and off the guide rails 23 of the pick-up guards and place it on the receiving conveyor A of the platform P.

In the harvesting of peas the outer divider has been found not to be efficient in preventing entanglement at the inner side of the machine since it exerts its function by parting the crop. The present invention proposes to leave the divider intact as a frame element of the machine, but its main function is taken over by a runner or ground shoe designated generally at 30. This runner or ground shoe has a ground engaging portion 31 and an upturned forward end 32 extending well forwardly of the machine and above the tops of the vines. The rear end of the ground engaging portion of the shoe is attached by means of a channel 33 and suitable fastening devices to the outer divider 16. The forwardly curved portion intermediate its ends is similarly suitably attached as at 34 to the forward end of the outer divider. A runner so constituted and organized with the machine, takes over the function of the outer divider and serves to press or crush against the ground the pea vines at the outer border of the swath cut by the sickle and effectively prevents entanglement, winding or wrapping.

Varying conditions met in the field make it desirable to controllably vary the pressure exerted by the runner or ground shoe 30 on the underlying pea vines. This is accomplished by fixing the forward end of a counter-balancing arm 35 to the outer side of the platform by means of bolts and nuts 36 (see Figs. 6, 7 and 18). The arm projects rearwardly beyond the platform and its projecting portion carries an adjustable counter-balancing weight 37. One or more set screws 38 releasably secures the weight 37 in adjusted position. With such a construction the arm 35 and its weight 37 pivot, in effect, about the axis of the outer ground wheel G' and controllably vary the force which presses the runner or ground shoe 30 downwardly.

The inner end of the platform is equipped with a frame member 40 which also is rockable about the axis of the outer ground wheel G (see Fig. 17). The forward end of this frame member 40 is pivotally connected as at 41 to the draw bar D. Manually controllable means is provided for releasably securing the frame member 40 and the draw bar D in the desired angular relation.

This means includes a slotted quadrant 42 securely bolted to the draw bar D and coacting with a spring projected, manually releasable, detent 43 carried by a hand lever 44, pivotally mounted on the vertical leg of the quadrant 42. An intermediate portion of the hand lever 44 is pivotally connected to the lower end of a link 45. The upper end of the link 45 is adjustably connected as at 46 to the curved upper end of a supporting standard 47. The lower end of this standard 47 is bolted as at 48 to the frame member 40. Adjacent its upper end this standard 47 is braced or supported by means of a brace 49 bolted at its lower end to the frame member 40 and bolted as at 51 to the upper portion of the brace 47.

The platform P is sufficiently resilient or flexible and the outer end thereof is so weighted by the elements making up the platform itself and by the elements supported thereon that the weight of the parts referred to is effective to supply and apply the force necessary to press the runner or ground shoe 30 toward the ground with the desired degree of force.

The feathering reel R comprises a central shaft 55 which may be a piece of pipe, supported at its ends for rotation in sleeve bearings 56 and 57, and outer and inner spiders 58 and 59 mounted on spaced portions of the central shaft 55 for rotation therewith, the outer spider 58 consisting simply of eight radiating arms 60 which may be wooden bars or strips attached at their inner ends to the shaft 55 by means of a hub plate 61 fixed to the shaft 55 and bolted or otherwise suitably secured to the radiating arms 60 (see Figs. 2 and 6). The inner spider 59 also includes eight radiating wooden arms or sticks 62 likewise fixed at their inner ends to the shaft 55 by a hub plate 63.

Angularly spaced finger carrying shafts 65 are journaled on the outer ends of the radiating arms 60 and 62 of the outer and inner spiders. For this purpose the outer end of each of the arms of the spiders may be equipped with a metal cap plate 66. The shafts 65 turn on the metal caps of axially aligned spider arms. U-shaped strips 67 have their bight portions encircling the shaft 65 to constrain them to rotation on the cap plates 66, the legs of the strips being secured by bolts and nuts 68 to the radiating arms of the spiders as clearly shown in Figs. 11 and 12.

Pick-up fingers or tines 70 are provided at spaced intervals along the shaft 65. These pick-up fingers 70 may be fashioned from wire of appropriate stiffness and yet of suitable resiliency, intermediate portions of the wire constituting the fingers 70, being coiled about the shaft 60 and the coils being united by a short length of wire 70a Fig. 11 which is fixed to its shaft 65 so that the fingers 70 are constrained to turn with the shafts 65 as well as to revolve or move bodily therewith.

The pick-up fingers or tines 70 are so disposed on the shaft 65 as to be movable between the pick-up or lifter guards L and function to take the material that has been lifted up by the lifter guards L, cut by the sickle S and carry such material over and off the pick-up guards L and place it on the conveyor A of the platform P.

The mechanism for rotating the reel and for imparting feathering motion to the shaft 65 is combined with the inner spider 59.

Bevel gearing is utilized to rotate the central shaft 55 and consequently the reel R. As shown to advantage in Figs. 2, 10 and 19, this bevel gearing comprises a driven beveled gear 71 having its hub 72 suitably fastened as at 73 to the shaft 55. A beveled driving pinion 74 meshes with the driven beveled gear 71. This pinion 74 is fixed to one end of a short shaft 75 rotatably mounted in a bearing bracket 76, bolted to a flange 77 of the bearing sleeve 57. The short shaft 75 is driven from a pulley 79 through a drive line designated generally at 80 and inclusive of universal joints 81 and 81' and a telescopic shaft section 82. The telescopic portions 82a and 82b of the shaft section 82 are of non-circular cross section so as to transmit torque but are freely adjustable or extensible lengthwise with respect to each other.

For imparting feathering motion to the pick-up fingers a carrier plate 85 is supported on the shaft 55 (see Fig. 9). The carrier plate 85 has a bearing sleeve 86 through which the shaft 55 extends and with respect to which the shaft 55 is freely rotatable. Double flanged rollers 87 journaled on spindles 87a are supported on the carrier plate for free rotary movement and are eccentrically disposed with respect to the shaft 55. An eccentric strap 88 in the form of an annular ring rides in the grooves of the double flanged eccentric rollers 87. A plurality of crank actuating arms 89 are provided, there being one such arm 89 for each radiating arm 62 of the inner spider 59.

Each crank actuating arm 89 is fixed at its inner end as at 90 to the eccentric strap 88. The outer end of each arm 89 is pivotally interconnected as at 91 (see Figs. 8 and 11) with an outer end of the crank arm 92. The inner end of each crank arm 92 is welded or otherwise suitably secured as at 93 to the adjacent end of a finger carrying shaft 65 of the reel R. With such a construction the pick-up fingers or tines 70 of each shaft 65 always remain parallel to the pick-up fingers or tines of the other shafts 65.

Provision is made for adjustment of the tines 70 with respect to the vertical and this is accomplished by shifting the carrier plate 85 and consequently the eccentric rollers relative to the shaft 55 and releasably securing the carrier plate 85 in any selected adjustment. In effecting this adjustment a strap-like bracket 95 is provided and has its outer end 96 bolted to the flange 77 of the bearing sleeve 57. The inner end of the strap like bracket has an upturned lug-like portion 97 provided with an arcuate slot 98. The carrier plate 85 has a bolt hole registering with the slot 98 in the various adjustments of the carrier plate. A bolt and nut 99 coacts with the bolt hole of the carrier plate 85 and with the slot 98 of the lug 97 of the bracket 95 to releasably secure the carrier plate 85 in any of its various adjustments.

The outer bearing sleeve for the shaft 55 has integrally formed therewith a depending slotted slide block 100 (see Figs. 13 and 14). The slide block 100 is, in turn, slidably mounted on a longitudinally extending supporting rail 101 mounted for vertical adjustment on the outer side of the machine. By shifting the slide block 100 longitudinally of its supporting rail 101 the reel R is adjustable fore and aft at its outer end. By raising and lowering the rail 101 the outer end of the reel R is adjusted up and down.

To releasably secure the slide block 100 in any fore and aft adjustment the supporting rail 101 has a series of notches 102. A bolt and nut 103 is provided and when removed, permits a fore and aft adjustment of the slide block, and when inserted through the bolt holes provided therefor in the slide block and extended through a selected notch 102 of the supporting rail, releasably secures the slide block in the selected fore and aft adjustment.

Adjacent its rear end the supporting rail 101 is pivotally mounted as at 104 on a supporting arm 105, fixed at its lower end to a stationary part of the machine. A brace element 106 is provided to maintain the supporting rail 101 in any selected vertical adjustment about its pivot 104. For this purpose one end of the brace is pivotally connected as at 107 to the supporting rail 101. The other end of the brace 106 is provided with a series of bolt holes 107' adapted to be selectively aligned with a bolt hole in the supporting arm 105, and secured in any selected adjustment by a bolt and nut 108.

The inner sleeve bearing 57 for the reel shaft 55 has a vertical sleeve 110 welded thereto (see Figs. 2, 15 and 19). This vertical sleeve 110 is slidably supported for vertical adjustment on a supporting rod 111, the lower end of the supporting rod being pivotally mounted as at 112 on a supporting bracket 113 suitably interconnected and supported by the frame of the machine.

The vertical sleeve 110 is secured in any vertical adjustment by means of a cotter pin 114 insertable through any one of a series of holes 115 provided in the sleeve 110 and through a similar hole in the supporting rod 111 with which the holes 115 are selectively aligned. The holes 115 or the hole in the supporting rod 111, or both, are larger in diameter than the cotter pin 114 so as to permit the desired relative rotation of the vertical sleeve 110 with respect to its supporting rod 111. In this way the reel may be inclined with respect to the receiving platform P.

The fore and aft adjustment of the inner end of the reel is effected by shifting the supporting rod 111 about its supporting pivot 112. The selected fore and aft adjustment is maintained by means of a latching lever 116, the forward end of which is pivotally connected as at 117 to the top of the supporting rod 111. The rear end of the latching lever 116 is formed with a hand grip or handle 118. Just forwardly of the handle 118 the latching lever 116 slides through the slot of a fixed keeper plate 119. The portion of the latching lever 116 slidable through the slot of the keeper plate 119 is provided with a series of downwardly facing notches 120, selectively engageable with the lower edge of the slot of the keeper plate, to secure the reel R in the selected fore and aft adjustment.

To prevent the latching lever 116 from accidentally disengaging its keeper plate, a pivoted locking plate 121 is mounted on the keeper plate 119 and is biased by its own weight to locking engagement with the latching lever 116 as will be clear from Figs. 15 and 16.

The material which has been lifted by the pick-up or lifter guards L, cut by the sickle S, and reeled onto the conveyor A of the platform P is delivered at the inner side of the platform P to the main elevator E.

The main elevator E comprises two endless conveyors, namely, a lower conveyor 120 and a superposed or upper conveyor 121. Both conveyors advantageously may be constituted of endless rubberized canvas belts equipped with appropriate transverse cleats or strips.

The lower conveyor 120 of the elevator E is trained about a lower idler roller 122 and an upper driving roller 123. Similarly the upper conveyor 121 is trained about a lower idler roller 124 and an upper driving roller 125. The shafts of the rollers 122, 123 and 124 are supported for rotation in suitable bearings provided therefor in the side walls 126 of the main elevator E. This main elevator E is of skeleton construction and has no bottom except that provided by the lower conveyor 120.

At their lower ends the side walls 126 are pivotally supported on the platform P and preferably on the shaft of the roller 12 of the receiving conveyor A of the platform P. In addition to the pivotal mounting of the side walls 126 on the platform P they are provided with two additional supports. More specifically, each side wall 126 is supported adjacent its lower end by a J-shaped standard 127 having its base fastened to the platform and the upper end of its vertical leg fastened to its side wall of the main elevator E.

Adjacent its upper end each side wall 126 of the conveyor receives additional support from a standard or supporting rod 128, the lower end thereof being supported on a stationary part of the platform or machine and the upper end of the standard 128 being fastened to its side wall 126.

As will be seen from Fig. 2 the idler roller 122 at the lower end of the lower endless conveyor 120 is disposed closely adjacent the delivery end of the conveyor A of the platform.

The lower idler roller 124 of the upper conveyor is displaced upwardly with respect to the roller 122 to facilitate entrance of the material into the elevator E. The upper rollers 123, and 125 of the conveyors 120 and 121 respectively, are also especially related to each other. With regard to the vertical they are closer than the lower rollers 122 and 124 so that the endless belt conveyors 120 and 121 converge toward their upper ends. Furthermore, the upper roller 125 is located beyond the upper roller 123. This disposition of the rollers supporting and driving the conveyors 120 and 121 of the main elevator E has definite advantages in that the consequential converging relationship of the endless conveyors results in a compression of the crop as it travels up the main elevator E and precludes its cascading down the elevator.

If an extra or excess amount of cut pea vines are passing upwardly through the main elevator E the lower run of the upper canvas belt or conveyor 121 is displaced or bowed upwardly adjacent the roller 125 as illustrated in Fig. 3 to accommodate the excess and through the incidental belt tightening action on the upper endless conveyor belt 121 improves the effective action of the main elevator E. Suitable adjusting mechanism indicated diagrammatically at 130 is provided for the lower rollers of the endless conveyors of the main elevator E.

The adjustable extension E' of the elevator likewise comprises two side walls 131. Each side wall is pivotally mounted on the shaft or axis of rotation 132 of the upper roller 123 of the lower conveyor 120 of the main elevator. An arcuate slot 133 is provided in each side wall 131 and is concentric with the shaft 132. The shaft of the upper roller 125 projects through this slot 133. This permits pivotal adjustment of the extension E' with respect to the main elevator E. The selected adjustment is maintained by means of suitable braces, one of which is designated at 134 in Fig. 2.

Each brace 134 is pivotally connected at its upper end as at 135 to its side wall 131 of the adjustable elevator extension E'. The lower end of such adjustable brace 134 is flattened and provided with a series of bolt holes 136. Each standard 128 has a bolt hole therethrough which may be selectively aligned with any one of the bolt holes 136. A bolt and nut 137 coacts with the aligned bolt holes of the brace 134 and the standard 128 to releasably secure the brace in adjusted position.

The adjustable elevator extension E' has a single endless belt conveyor 140 which receives the crop from the conveyors of the main elevator E and discharges it into the truck or trailer.

Hold down rods or guides 141 are pivotally mounted as at 142 on the side walls of the adjustable elevator extension E' and press the peas onto the upper run of the conveyor 140 to obtain better traction and to hold the vines on the conveyor 140 when windy conditions are encountered in the field.

The various instrumentalities of the machine previously described may be driven from any suitable source of power through any appropriate motion transmission means. Preferably the drive is taken from the power take-off (not shown) of the tractor T and is transmitted largely through belt and pulley gearing so as to keep the weight of the machine to the very minimum.

As diagrammatically illustrated in Fig. 4, a main drive shaft 145, which is rotated from the power take-off of the tractor or other suitable source of power, is connected by a universal coupling 146 to a shaft 147 (see also Fig. 2) supported for rotation on the inner side of the platform P. The drive shaft 147 has a drive pulley 148 fixed thereto. A belt 149 is trained or reeved about the drive pulley 148 and also about an idler pulley 150, about a driven pulley 151 fixed to the shaft or axis of the drive roller 12 of the receiving conveyor A of the platform P and about the driven pulley 79 which actuates the drive line 80 for the reel R and also the feathering mechanism thereof, as previously described.

A crank and pitman designated at 152 actuates the cutter bar of the sickle, the crank being rotated by a counter shaft 153 driven by chain and sprocket gearing 154 from the shaft 147. A second drive pulley 155 is also fixed to shaft 147 and drives a belt 156 trained or reeved over idler pulleys 157 and over a driven pulley 158 fixed to the shaft or axis of the upper drive roller 123 of the lower endless conveyor 120 of the main elevator E. The upper drive rollers 123 and 125 of the lower and upper conveyors 120 and 121 of the main elevator E are geared together by intermeshing spur gears 159 and 160. The shaft or axis of the drive roller 123 has a drive pulley 161 fixed thereto and driving a belt 162 which actuates a driven pulley 163 fixed to the shaft or axis of the drive roller 164 of the endless canvas conveyor 140 of the elevator extension E'.

The combined organization of a skeleton construction of the main elevator E and its adjustable extension E', the resort to endless canvas conveyor belts as the receiving conveyor A of the platform P, the superposed conveyors of the main elevator E and the single delivery conveyor of the adjustable elevator extension E' together with the extensive use of the belt drives minimizes the weight of the machine. Light weight is a very desirable characteristic in pea harvesters and loaders.

The various other novel structural characteristics and important advantages of the machine, will, it is thought, be clearly understood from the foregoing description, the accompanying drawings and the appended claims.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What I claim is:

1. A machine for cutting peas comprising a harvester including a platform, a conveyor carried by the platform, a sickle carried on the front side of the platform, regular guards carried by the platform in position to cooperate with the sickle, pick-up guards on the platform between the regular guards, a reel, a sloping backboard inclining upwardly and rearwardly from the rear side of the platform to provide a continuous guide and to provide clearance for the reel to operate to kick the cut pea vines completely clear of the guards, and means supporting the reel for rotation about an inclined axis with the outer end of the reel closer to the backboard than the inner end thereof with the result that the reel, at its outer end, kicks the cut material close up against the backboard and on the rear portion of the conveyor leaving the front portion of the conveyor at and adjacent its inner end unloaded and free therebeyond to accommodate the progressively increasing accumulation of material.

2. A machine for cutting peas comprising a harvester including a platform, a conveyor thereon, a sickle carried on the front edge of the platform and an elevator extending from one end of and forming a continuation of said conveyor, a rotatable reel element disposed generally above and at the front of the platform, a supporting bracket at each end of the reel element and carrying said reel element in a position with its axis angled so that its end remote from said elevator is displaced rearwardly from the end of said conveyor adjacent said elevator for the purpose of moving material to the rear of said conveyor at the end remote from said elevator to provide a relatively clear space on said conveyor for material cut by that portion of the sickle adjacent said elevator, and a backboard extending upwardly from the rear edge of said platform and sloping rearwardly away from said reel to provide clearance for said reel to disengage itself from material deposited on the rear of said conveyor adjacent said backboard.

3. A machine for cutting peas comprising a harvester including an elongated platform disposed transversely of the direction of travel of the machine and having an endless conveyor extending therealong, inner and outer ground wheels supporting the platform for movement over the ground and for tilting movement with respect thereto, a sickle carried by the platform and fixed to the forward edge thereof, a runner shoe carried by the platform and extending forwardly and upwardly in position to press to the ground the pea vines lying at the outer border of the swath cut by the sickle to provide for severing by the sickle of said vines from those lying beyond said outer border, an arm fixed to the outer side of the platform and projecting rearwardly beyond the platform, a weight adjustable along the arm for counterbalancing the weight on said runner shoe to control the downward pressure exerted thereby on the pea vines, a draw bar pivotally connected to the inner side of the platform and manually adjustable means for limiting the downward movement of the pivotal connection between the inner end of the platform and the draw bar.

4. A machine for cutting peas comprising a harvester including an elongated platform disposed transversely of the direction of travel of the machine and having an endless conveyor extending therealong, inner and outer ground wheels supporting the platform for movement over the ground and for tilting movement with respect thereto, a sickle carried by the platform and fixed to the forward edge thereof, a runner shoe carried by the platform and underlying the same on the outer side thereof and extending forwardly and upwardly in position to press to the ground the pea vines lying at the outer border of the swath cut by the sickle to provide for severing by the sickle of said vines from those lying beyond said outer border, counterbalancing means for limiting the proportion of the weight of the platform imposed on said runner shoe to control the downward pressure exerted thereby on the pea vines, a draw bar pivotally connected to the inner side of the platform and manually adjustable means for limiting the downward movement of the pivotal connection between the inner end of the platform and the draw bar.

5. A machine for cutting peas comprising a harvester including an elongated platform disposed transversely of the direction of travel of the machine and having an endless conveyor extending therealong, inner and outer ground wheels supporting the platform for movement over the ground and for tilting movement with respect thereto, a sickle carried by the platform and fixed to the forward edge thereof, a runner shoe carried by the platform and underlying the same on the outer side thereof and extending forwardly and upwardly in position to press to the ground the pea vines lying at the outer border of the swath cut by the sickle to provide for severing by the sickle of said vines from those lying beyond said outer border, a draw bar pivotally connected to the inner side of the platform and manually adjustable means for limiting the downward movement of the pivotal connection between the inner end of the platform and the draw bar.

6. A machine for cutting peas comprising a harvester including an elongated platform disposed transversely of the direction of travel of the machine and having an endless conveyor extending therealong, inner and outer ground wheels supporting the platform for movement over the ground and for tilting movement with respect thereto, a sickle carried by the platform and fixed to the forward edge thereof, a runner shoe carried by the platform and underlying the same on the outer side thereof and extending forwardly and upwardly in position to press to the ground the pea vines lying at the outer border of the swath cut by the sickle to provide for severing by the sickle of said vines from those lying beyond said outer border, counterbalancing means for limiting the proportion of the weight of the platform imposed on said runner shoe to control the downward pressure exerted thereby on the pea vines.

7. A machine for cutting peas comprising a harvester including an elongated platform disposed transversely of the direction of travel of the machine and having an endless conveyor extending therealong, inner and outer ground wheels supporting the platform for movement over the ground and for tilting movement with respect thereto, a sickle carried by the platform and fixed to the forward edge thereof, a runner shoe carried by the platform and underlying the same on the outer side thereof and extending forwardly and upwardly in position to press to the ground the pea vines lying at the outer border of the swath cut by the sickle to provide for severing by the sickle of said vines from those lying beyond said outer border.

PAUL R. SCHROEPPEL.

REFERENCES CITED

The following references are of record in the file of this patent:

UNITED STATES PATENTS

| Number | Name | Date |
| --- | --- | --- |
| 86,449 | Rank et al. | Feb. 2, 1869 |
| 112,575 | Fellows | Mar. 14, 1871 |
| 241,669 | Keller | May 17, 1881 |
| 446,316 | Anthony | Feb. 10, 1891 |
| 773,913 | Berkeley | Nov. 1, 1904 |
| 802,482 | Sharp | Oct. 24, 1905 |
| 925,664 | Sonnichsen | June 22, 1909 |
| 1,004,930 | Stone | Oct. 3, 1911 |
| 1,179,707 | Downing | Apr. 18, 1916 |
| 1,485,468 | Reichel | Mar. 4, 1924 |
| 1,666,137 | Heuer | Apr. 17, 1928 |
| 1,850,753 | Johnson | Mar. 22, 1932 |
| 1,960,596 | Rimple | May 29, 1934 |
| 2,071,844 | Korsmo et al. | Feb. 23, 1937 |
| 2,115,385 | Edgington | Apr. 26, 1938 |
| 2,143,264 | Fleming | Jan. 10, 1939 |
| 2,165,381 | Hume et al. | July 11, 1939 |
| 2,165,382 | Hume et al. | July 11, 1939 |
| 2,325,857 | Huddle | Aug. 3, 1943 |
| 2,343,444 | Coon | Mar. 7, 1944 |
| 2,380,173 | Harrison | July 10, 1945 |
| 2,395,075 | Smith | Feb. 19, 1946 |